US012673620B2

(12) United States Patent
Asano et al.

(10) Patent No.: US 12,673,620 B2
(45) Date of Patent: Jul. 7, 2026

(54) IN-VEHICLE SYSTEM AND ASSEMBLING METHOD OF IN-VEHICLE SYSTEM

(71) Applicant: JVCKENWOOD Corporation, Yokohama (JP)

(72) Inventors: Kosuke Asano, Yokohama (JP); Yuki Takahashi, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 65 days.

(21) Appl. No.: 18/973,136

(22) Filed: Dec. 9, 2024

(65) Prior Publication Data

US 2025/0100460 A1 Mar. 27, 2025

Related U.S. Application Data

(63) Continuation of application No. PCT/JP2023/000251, filed on Jan. 10, 2023.

(30) Foreign Application Priority Data

Jun. 21, 2022 (JP) ................................. 2022-099348

(51) Int. Cl.
 *B60R 11/02* (2006.01)
 *B60R 11/00* (2006.01)
 *B62D 65/14* (2006.01)
(52) U.S. Cl.
 CPC .......... *B60R 11/0205* (2013.01); *B62D 65/14* (2013.01); *B60R 2011/0005* (2013.01)
(58) Field of Classification Search
 CPC ........ B60R 11/0205; B60R 2011/0005; B62D 65/14

(Continued)

(56) References Cited

U.S. PATENT DOCUMENTS 4,462,564 A * 7/1984 Alves ..................... B60K 35/50
 455/345
4,895,326 A * 1/1990 Nimpoeno ............. B60K 35/50
 455/345

(Continued)

FOREIGN PATENT DOCUMENTS

JP 2013-199199 10/2013

OTHER PUBLICATIONS

International Search Report and Written Opinion for International Application Serial No. PCT/JP2023/000251 mailed Apr. 4, 2023, 8 pages.

*Primary Examiner* — Anita M King
(74) *Attorney, Agent, or Firm* — Amin, Turocy & Watson, LLP

(57) ABSTRACT

An in-vehicle system includes: an in-vehicle device that includes a device main unit with a panel provided on a front surface thereof; a cluster panel that is arranged on the panel; a positioning mechanism which mutually positions the panel and the cluster panel; a vehicle mounting bracket that is fixed to the cluster panel and the device main unit, and that is mounted on a vehicle; and multiple mounting holes that are aligned in a vehicle longitudinal direction in the vehicle mounting bracket and which correspond to screw holes which are provided on a side surface of the device main unit, each of which has a larger diameter than each of screw holes, and a vertical diameter of the mounting hole is formed to be larger as the mounting hole is positioned towards a vehicle front side.

5 Claims, 10 Drawing Sheets

(58) Field of Classification Search
USPC ........................................................ 248/27.1
See application file for complete search history.

(56)                          References Cited

U.S. PATENT DOCUMENTS

| | | | | |
|---|---|---|---|---|
| 4,911,386 | A | * | 3/1990 | Putman .................. B60K 35/50 |
| | | | | 455/345 |
| 5,106,039 | A | * | 4/1992 | Gross ................. B60R 11/0205 |
| | | | | 248/27.1 |
| 5,467,947 | A | * | 11/1995 | Quilling, II ......... B60R 16/0231 |
| | | | | 248/27.1 |
| 5,791,606 | A | * | 8/1998 | Blackburn ............. B60K 35/50 |
| | | | | 361/814 |
| 6,651,936 | B2 | * | 11/2003 | Upson .................... B60K 35/50 |
| | | | | 248/27.3 |
| 7,430,110 | B2 | * | 9/2008 | Quilling, II ............. B60R 11/02 |
| | | | | 361/679.01 |
| 9,403,488 | B1 | * | 8/2016 | An ......................... B60K 35/50 |
| 2007/0007414 | A1 | * | 1/2007 | Matsuda ................ B60K 35/10 |
| | | | | 248/298.1 |

\* cited by examiner

IN-VEHICLE SYSTEM AND ASSEMBLING METHOD OF IN-VEHICLE SYSTEM

CROSS-REFERENCE TO RELATED APPLICATIONS

This application is a Continuation of PCT International Application No. PCT/JP2023/000251 filed on Jan. 10, 2023 which claims the benefit of priority from Japanese Patent Application No. 2022-099348 filed on Jun. 21, 2022, the entire contents of both of which are incorporated herein by reference.

FIELD OF THE INVENTION

The present invention relates to an in-vehicle system and an assembling method of an in-vehicle system.

BACKGROUND OF THE INVENTION

Conventionally, for example, an in-vehicle system is disclosed in Japanese Laid-open Patent Publication No. 2013-199199 A. This in-vehicle system includes an in-vehicle device (in-vehicle-device main unit), a cluster panel, an instrument-panel mounting bracket. The cluster panel has an instrument-panel mounting portion and a cluster-side positioning protrusion on its rear surface. The in-vehicle device has an in-vehicle-side positioning protrusion. In this in-vehicle system, the in-vehicle-device main unit and the cluster panel are positioned with the cluster-side positioning protrusion and the in-vehicle-side positioning protrusion.

Conventionally, the in-vehicle device is fixed such that a vehicle mounting bracket fixed to its side surface with screws is screwed to an in-vehicle-side fixing portion. If there is a positional misalignment between the cluster panel and an in-vehicle device panel, it affects the appearance. Therefore, it is necessary to mount the vehicle mounting bracket to the cluster panel so as not to obstruct a positioning alignment between the cluster panel and the in-vehicle device, and to mount it to the in-vehicle device without positioning. Accordingly, the positional relationship between the in-vehicle device and the vehicle mounting bracket depends on the positional relationship between the in-vehicle device and the cluster panel. For example, if there is variation in the positional relationship between the in-vehicle device and the cluster panel, screw holes on the in-vehicle device for mounting holes on the vehicle mounting bracket are misaligned, and making it impossible to fix with screws, and thus impossible to mount the vehicle mounting bracket to the in-vehicle device. If the mounting holes on the vehicle mounting bracket are enlarged to avoid this situation, a contact area between a bearing surface of the screws and the vehicle mounting bracket becomes smaller. This leads to insufficient friction when the in-vehicle device and the vehicle mounting bracket are fastened, and a necessary fastening force cannot be obtained. Thus there is a risk of loosening the screws.

SUMMARY OF THE INVENTION

An in-vehicle system and an assembling method of an in-vehicle system are disclosed.

According to one aspect of the present application, there is provided an in-vehicle system comprising: an in-vehicle device that includes a device main unit with a panel provided on a front surface thereof; a cluster panel that is arranged on the panel; a positioning mechanism which mutually positions the panel and the cluster panel; a vehicle mounting bracket that is fixed to the cluster panel and the device main unit, and that is mounted on a vehicle; and multiple mounting holes that are aligned in a vehicle longitudinal direction in the vehicle mounting bracket and which correspond to screw holes which are provided on a side surface of the device main unit, each of which has a larger diameter than each of screw holes, and a vertical diameter of the mounting hole is formed to be larger as the mounting hole is positioned towards a vehicle front side.

According to one aspect of the present application, there is provided an assembling method of an in-vehicle system that includes: an in-vehicle device that includes a device main unit with a panel provided on a front surface thereof; a cluster panel that is arranged on the panel; a positioning mechanism which mutually positions the panel and the cluster panel; a vehicle mounting bracket that is fixed to the cluster panel and the device main unit, and that is mounted on a vehicle; and multiple mounting holes that are aligned in a vehicle longitudinal direction in the vehicle mounting bracket and which correspond to screw holes which are provided on a side surface of the device main unit, each of which has a larger diameter than each of screw holes, and a vertical diameter of the mounting hole is formed to be larger as the mounting hole is positioned towards a vehicle front side, the method comprising: positioning the cluster panel and the panel by the positioning mechanism; fixing the vehicle mounting bracket to the cluster panel; and fixing the vehicle mounting bracket to the device main unit by fastening screws in the screw holes through the mounting holes.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE INVENTION

Hereinafter, a form to implement the present application (hereinafter, embodiments) will be explained in detail with reference to the drawings. The embodiments in the following are not intended to limit the present application. Moreover, components in the following embodiments include those easily conceivable by a person skilled in the art, those that are substantially identical, and those within a so-called equivalent range. Furthermore, the components disclosed in the following embodiment can be combined as appropriate.

An in-vehicle system of embodiments is installed inside an interior of a vehicle. The in-vehicle system is mounted on, for example, an instrument panel of a vehicle.

Figure 1:
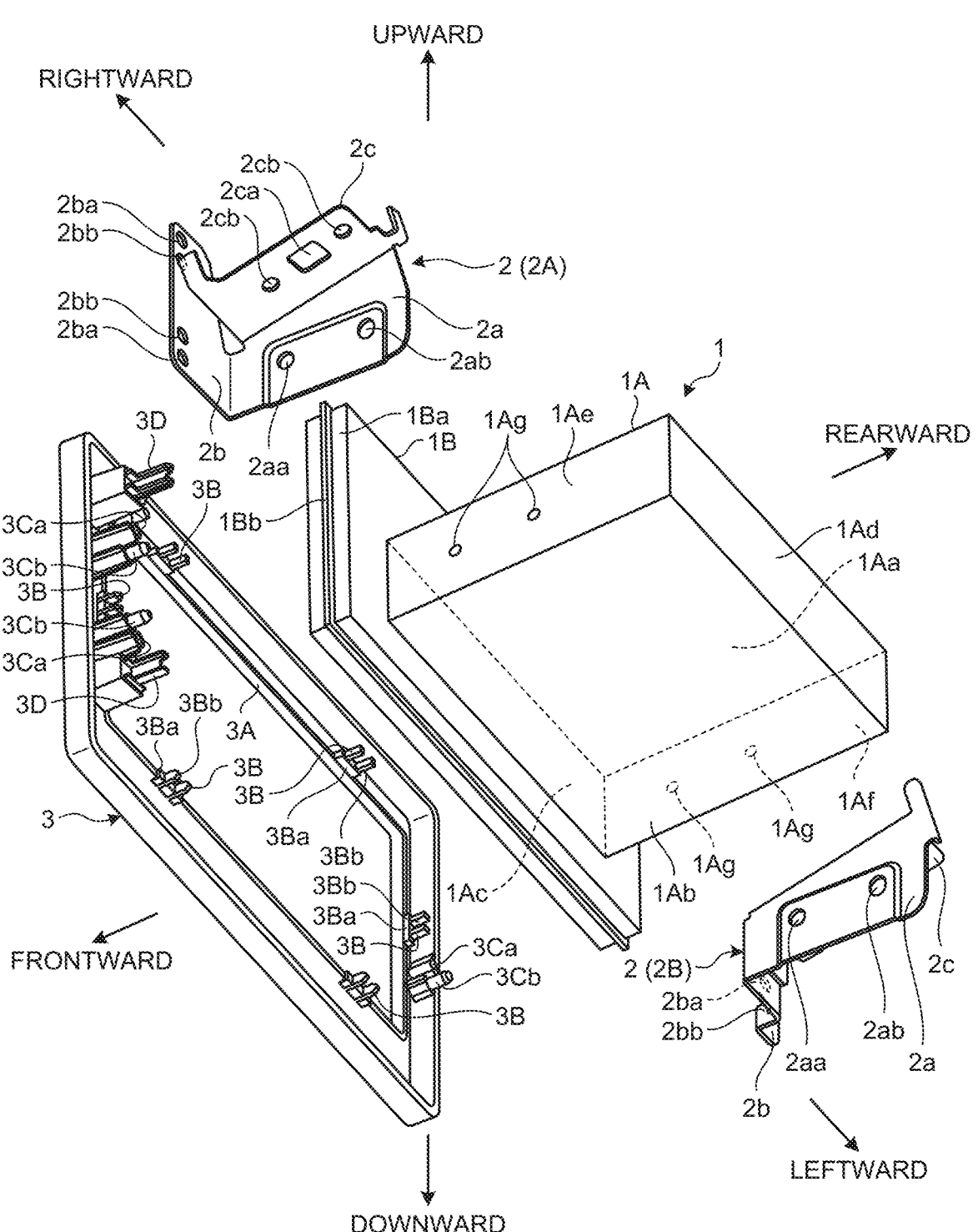
FIG. 1 is an exploded perspective view of an in-vehicle system according to an embodiment.

The in-vehicle system includes, as illustrated in FIG. 1, an in-vehicle device 1, vehicle mounting brackets 2, and a cluster panel 3.

The in-vehicle device 1 is, for example, a navigation system or an audio system with a display. The in-vehicle device 1 includes a device main unit 1A and a panel 1B.

The device main unit 1A has a rectangular box-shaped casing that has a top surface 1Aa facing upward, a bottom surface 1Ab facing downward, a front surface 1Ac facing forward, a rear surface 1Ad facing backward, a right surface (side surface) 1Ae facing right, and a left surface (side surface) 1Af facing left. The casing of the device main unit 1A has a structure in which the front surface 1Ac is open, and the top surface 1Aa, the bottom surface 1Ab, the rear surface 1Ad, the right surface 1Ae, and the left surface 1Af are closed with sheet metals. In the in-vehicle device, a top side, a bottom side, a front side, a rear side, a right side, and a left side are defined in a state in which the in-vehicle device 1 is installed in front of a driver seat of a vehicle. That is, a side facing from a front of the driver seat towards the driver seat is referred to as the "front," and a side facing from the front of the driver seat towards a windshield in the front of the vehicle is referred to as the "rear", a right side and a left side are defined relative to a direction viewed from the front side of the in-vehicle device 1. The device main unit 1A is arranged inside a vehicle cluster (also referred to as a dashboard) when installed in the vehicle.

The device main unit 1A has screw holes 1Ag formed on both the right and left surfaces 1Ae, 1Af. The screw hole 1Ag is to mount the vehicle mounting bracket 2 on the device main unit 1A. The screw holes 1Ag are arranged in a row along a front-to-rear direction on both the right surface 1Ae and the left surface 1Af with multiple holes (two in this embodiment). Each of the screw holes 1Ag has the same diameter.

The panel 1B is a display panel, and is formed in a plate shape extending in a rectangular shape in vertical and horizontal directions, with a display surface facing the front, and is arranged on the front side of the device main unit 1A. The panel 1B covers the front side of the device main unit 1A. The panel 1B is larger than the device main unit 1A in the vertical direction and the horizontal direction in the embodiment. The display surface of the panel 1B is constituted of, for example, a liquid crystal display (LCD) or an organic electroluminescence (EL) display. The display surface can be configured as a touch panel. Although not illustrated, the panel 1B may have operating buttons to perform various kinds of operations of the in-vehicle device 1 provided thereon.

The panel 1B has an outer peripheral surface 1Ba which is annularly continuous in the vertical and horizontal directions, and a rib 1Bb which is similarly annularly continuous is formed thereon. The rib 1Bb functions as a positioning mechanism to mutually position the panel 1B and the cluster panel 3, in cooperation with claw portions 3B of the cluster panel 3. The claw portion 3B will be explained in detail in explanation of the cluster panel 3 later.

The vehicle mounting bracket 2 is attached to the device main unit 1A, and is attached to a vehicle. The vehicle mounting bracket 2 has a right-side vehicle-mounting bracket 2A attached to the right surface 1Ae of the device main unit 1A and a left-side vehicle mounting bracket 2B attached to the left side 1Af. These right-side vehicle-mounting bracket 2A and the left-side vehicle-mounting bracket 2B have a bilaterally symmetrical configuration. In the following, the same reference sign is assigned to equivalent components, and one of the vehicle mounting brackets 2 will be explained.

Figure 2:
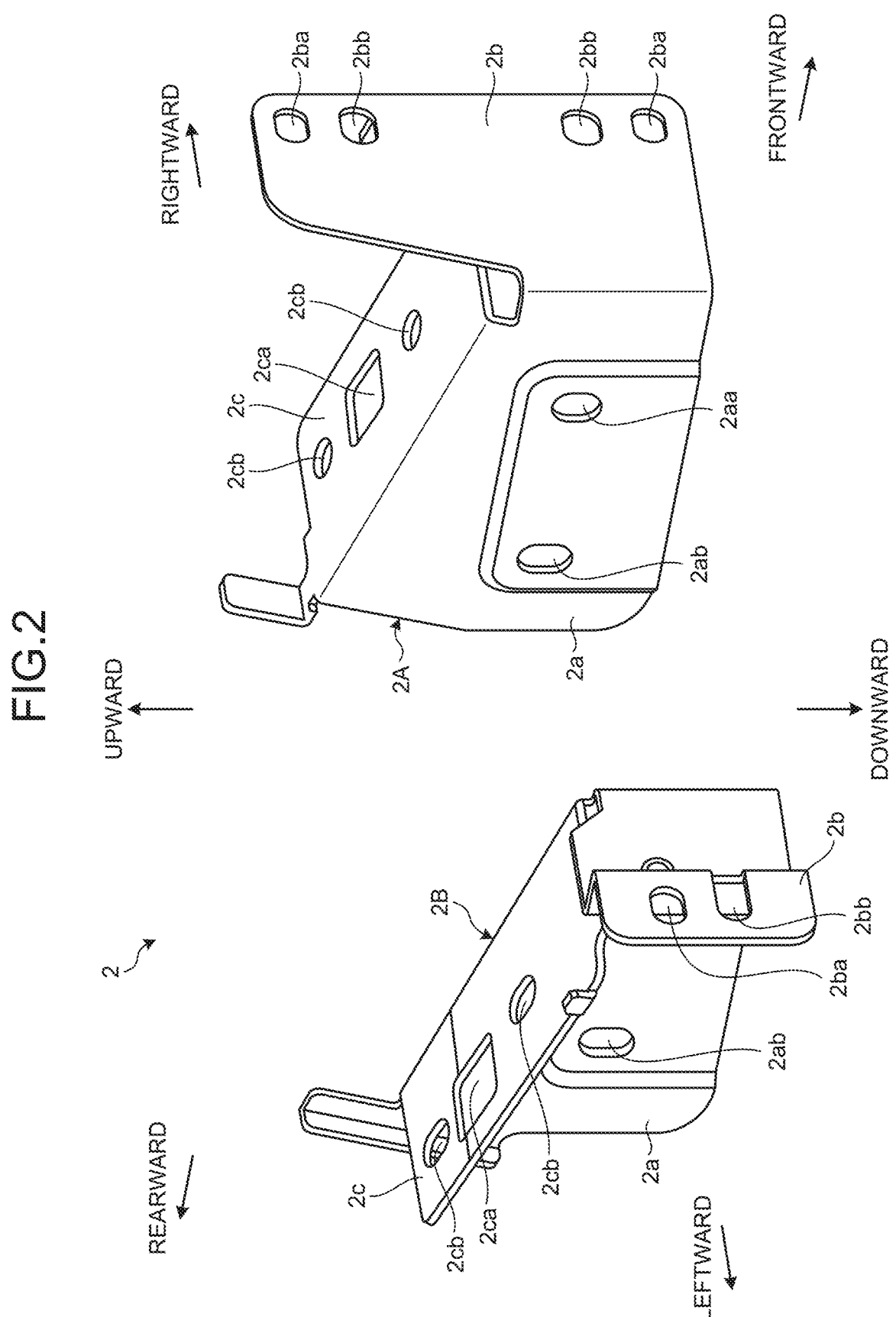
FIG. 2 is a perspective view of a vehicle mounting bracket of the in-vehicle system according to the embodiment.
Figure 3:
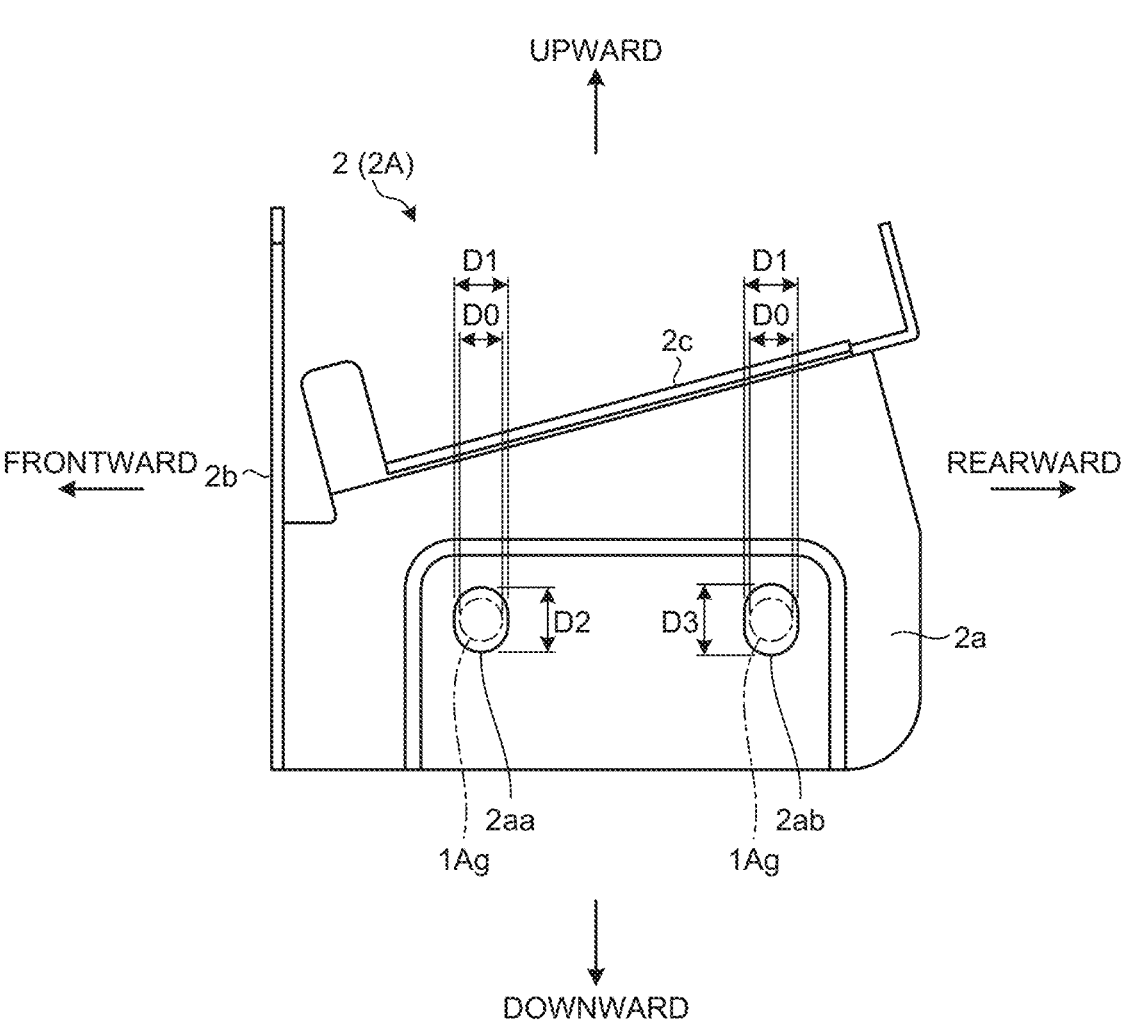
FIG. 3 is a side view of the vehicle mounting bracket of the in-vehicle system according to the embodiment.

The vehicle mounting bracket 2 is constituted of a metal plate, and has, as illustrated in FIG. 1 to FIG. 3, a device-side contact piece 2a, a panel-side contact piece 2b, and a vehicle-side contact piece 2c.

The device-side contact piece 2a is formed in a plate shape with a plate surface facing the side (the right side or the left side) so as to be arranged abutting along the side surface of the device main unit 1A (the right surface 1Ae or the left surface 1Af). In the device-side contact piece 2a, multiple mounting holes 2aa, 2ab (two in the embodiment) piercing therethrough are formed aligned in the front-to-rear direction to correspond with the respective screw holes 1Ag arranged in the front-to-rear direction on each of the side surfaces (the right surface 1Ae and the left surface 1Af) of the device main unit 1A. Each of the mounting holes 2aa, 2ab is formed to have a larger diameter than the screw hole 1Ag as illustrated in FIG. 3. Furthermore, in the mounting holes 2ab and 2bb, the diameter thereof is formed more larger as the mounting hole is positioned towards the rear side (positioned towards the vehicle front side). Specifically, in the mounting holes 2aa and 2ab, a front-to-rear hole diameter D1 thereof is formed to be larger than a diameter D0 of the screw hole 1Ag, and a vertical hole diameter D3 of the mounting hole 2ab positioned in the rear side is formed to be larger than the vertical hole diameter D2 of the mounting hole 2aa. For example, the respective mounting holes 2aa, 2ab are formed with respect to the screw holes 1Ag, for example, as D1/D0=1.5, D2/D0=1.8, D3/D0=2.

The panel-side contact piece 2b is formed in a plate shape with a plate surface facing forward so as to be arranged abutting on the cluster panel 3. It is arranged such that the panel-side contact piece 2b itself abuts on an abutting portion 3Ca of the cluster panel 3. Moreover, in the panel-side contact piece 2b, an engaging hole 2ba through which a screw 4 (refer to FIG. 7) screwed to an abutting portion 3Ca is inserted and engaged, is formed through penetration. Furthermore, in the panel-side contact piece 2b, an insertion hole 2bb in which a protruding portion 3Cb of the cluster panel 3 is inserted is formed through penetration. The abutting portion 3Ca and the protruding portion 3Cb of the cluster panel 3 will be described in detail in explanation of the cluster panel 3 later.

The vehicle-side contact piece 2c is formed in a plate shape with a plate surface facing downward so as to be arranged abutting on a mounting surface on the vehicle not illustrated. In the vehicle-side contact piece 2c, an insertion hole 2ca is formed through penetration in which a protruding portion formed on the mounting surface on the vehicle in a protruding manner is inserted. The insertion hole 2ca is formed in a substantially rectangular shape, and is formed such that a protruding portion of a rectangular shape is inserted therein with some margin. Moreover, in the vehicle-side contact piece 2c, engaging holes 2cb into which screws screwed to the mounting surface of the vehicle are inserted and engaged are formed through penetration respectively in front and behind the insertion hole 2ca.

Figure 4:
FIG. 4 is a rear view of a cluster panel of the in-vehicle system according to the embodiment.

The cluster panel 3 is formed in a rectangular frame shape so as to surround an outer periphery of the panel 1B of the in-vehicle device 1 as illustrated in FIG. 1 and FIG. 4. The cluster panel 3 has an inner peripheral surface 3A that is formed along the outer peripheral surface 1Ba of the panel 1B. That is, the panel 1B is inserted inside a frame of the cluster panel 3 such that the outer peripheral surface 1Ba faces the inner peripheral surface 3A. The inner peripheral surface 3A is formed in an annularly continuous manner in the vertical and horizontal directions. The cluster panel 3 has the claw portions 3B, abutting portions 3Ca, and protruding portions 3Cb.

The claw portion 3B functions as a positioning mechanism to mutually position the panel 1B and the cluster panel 3, in cooperation with the rib 1Bb of the panel 1B. The claw portion 3B is arranged on the upper and the lower inner peripheral surfaces 3A, and on the left and the right inner peripheral surfaces 3A. In the embodiment, the six claw portions 3B are provided, that is, two positions each on the upper and the lower inner peripheral surfaces 3A, and one position each on the left and the right inner peripheral surfaces 3A. The claw portion 3B engages the rib 1Bb of the panel 1B in the in-vehicle device 1, and includes a supporting claw 3Ba and a restricting claw 3Bb. The supporting claw 3Ba are formed to protrude downward on the upper side, upward on the lower side, leftward on the right side, and rightward on the left side. The restricting claws 3Bb are all formed to protrude backward. The panel 1B is inserted inside the frame of the cluster panel 3 from the rear side. At this time, the respective supporting claws 3Ba abut on the rib 1Bb of the panel 1B on the front side. Therefore, movement of the panel 1B to a forward direction is restricted by abutment of the rib 1Bb on each of the supporting claws 3Ba. Furthermore, the respective restricting claws 3Bb respectively abut on the ribs 1Bb of the panel 1B on the upper side, the lower side, the right side, and the left side. Therefore, movement of the panel 1B in the vertical and horizontal directions is restricted by abutment of the rib 1Bb on the respective restricting claws 3Bb. Therefore, the panel 1B is positioned being restricted from moving in the forward, upward, downward, leftward, and rightward directions relative to the cluster panel 3 by the claw portions 3B.

The abutting portion 3Ca is formed to protrude backward on the left and the right outer sides of the frame formed by the inner peripheral surface 3A of the cluster panel 3. The abutting portion 3Ca abuts on the panel-side contact piece 2b of the vehicle mounting bracket 2 at its protruding distal end surface. The abutting portion 3Ca is configured such that the screw 4 (refer to FIG. 7) is fastened to the protruding distal end surface. The protruding portion 3Cb is formed with the abutting portion 3Ca to protrude backward on the outer sides of the frame formed by the inner peripheral surface 3A of the cluster panel 3. The protruding portion 3Cb is inserted into the insertion hole 2bb of the panel-side contact piece 2b of the vehicle mounting bracket 2. The vehicle mounting bracket 2 is restricted from moving in the forward and backward directions relative to the cluster panel 3 as the screw 4 is fastened to the distal end surface of the abutting portion 3Ca through the engaging hole 2ba of the panel-side contact piece 2b in a state in which the protruding portion 3Cb is inserted in the insertion hole 2bb and the panel-side contact piece 2b abuts on the protruding distal end surface of the abutting portion 3Ca, and is restricted from moving in a rotational direction centered around the screw 4 by the protruding portion 3Cb. Therefore, the vehicle mounting bracket 2 is positioned relative to the cluster panel 3 by the abutting portion 3Ca, the protruding portion 3Cb, and the screw 4, to be fixed.

In the cluster panel 3, as illustrated in FIG. 1 and FIG. 4, an engaging protrusion 3D is formed to protrude backward on the right outer side of the frame formed by the inner peripheral surface 3A. The engaging protrusion 3D is inserted into an engaging hole on the vehicle side to be engaged, although not illustrated.

Hereinafter, an assembling method of the in-vehicle system of the embodiment will be explained, referring to a flowchart in FIG. 5 and an assembly procedure in FIG. 6 to FIG. 10.

Figure 5:
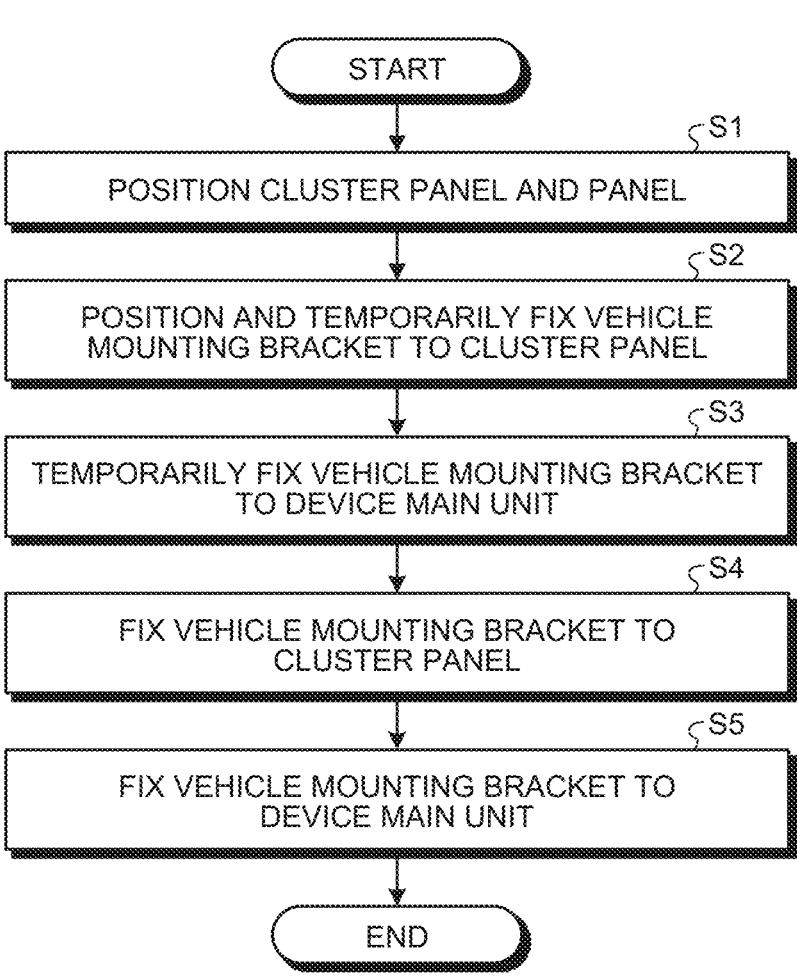
FIG. 5 is a flowchart of an assembling method of the in-vehicle system according to the embodiment.
Figure 6:
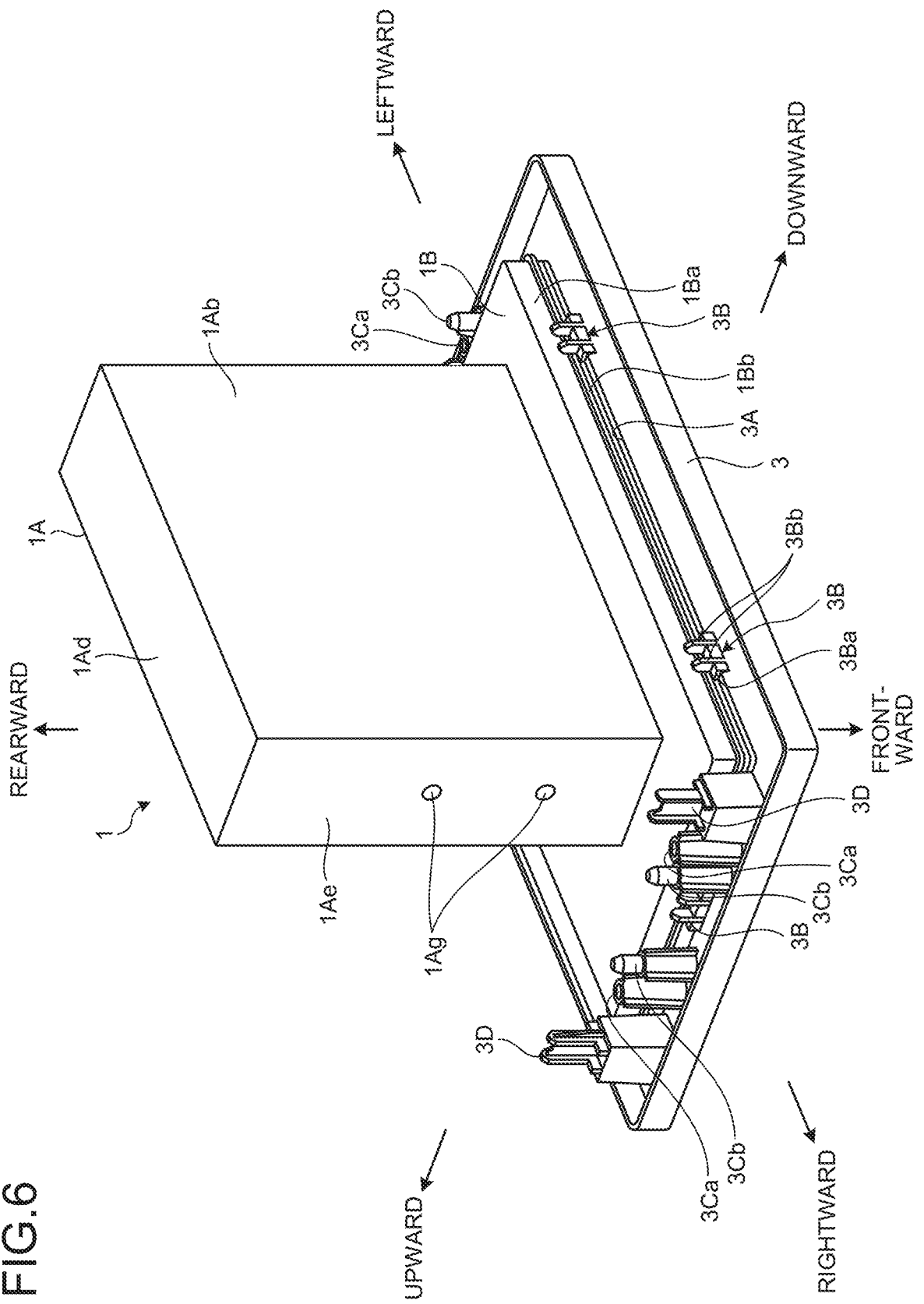
FIG. 6 is a perspective view of an assembly procedure of the in-vehicle system according to the embodiment.

In the assembling method of the in-vehicle system of the embodiment, as illustrated in FIG. 5 and FIG. 6, at step S1, the cluster panel 3 and the panel 1B are positioned. At step S1, the cluster panel 3 is placed on a flat stand with a front side facing downward. In this state, a front side of the panel 1B is inserted from the rear side into the frame of the cluster panel 3. The panel 1B is then restricted from moving in the vertical and horizontal directions relative to the cluster panel 3 by the claw portions 3B, to be positioned.

Figure 7:
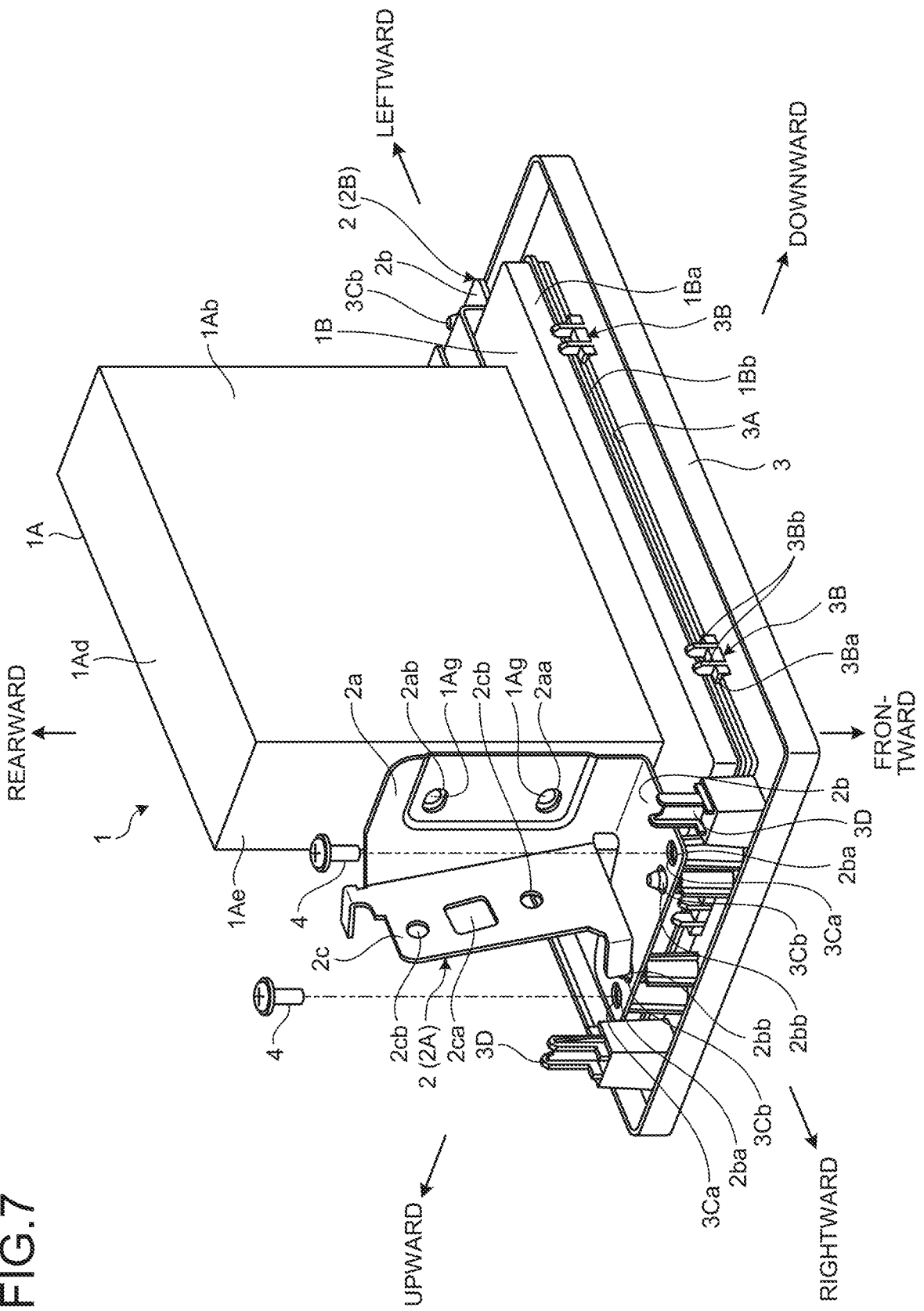
FIG. 7 is a perspective view of an assembly procedure of the in-vehicle system according to the embodiment.

Next, as illustrated in FIG. 5 and FIG. 7, at step S2, the vehicle mounting bracket 2 is positioned relative to the cluster panel 3, and is temporarily fixed thereto. At step S2, the protruding portion 3Cb of the cluster panel 3 is inserted in the insertion hole 2bb of the panel-side contact piece 2b of the vehicle mounting bracket 2, and the screw 4 is fastened to the distal end surface of the abutting portion 3Ca through the engaging hole 2ba in a state in which the panel-side contact piece 2b abuts on the protruding distal end surface of the abutting portion 3Ca. Thus, the vehicle mounting bracket 2 is positioned relative to the cluster panel 3 by the abutting portion 3Ca, the protruding portion 3Cb, and the screw 4, to be temporarily fixed.

Figure 8:
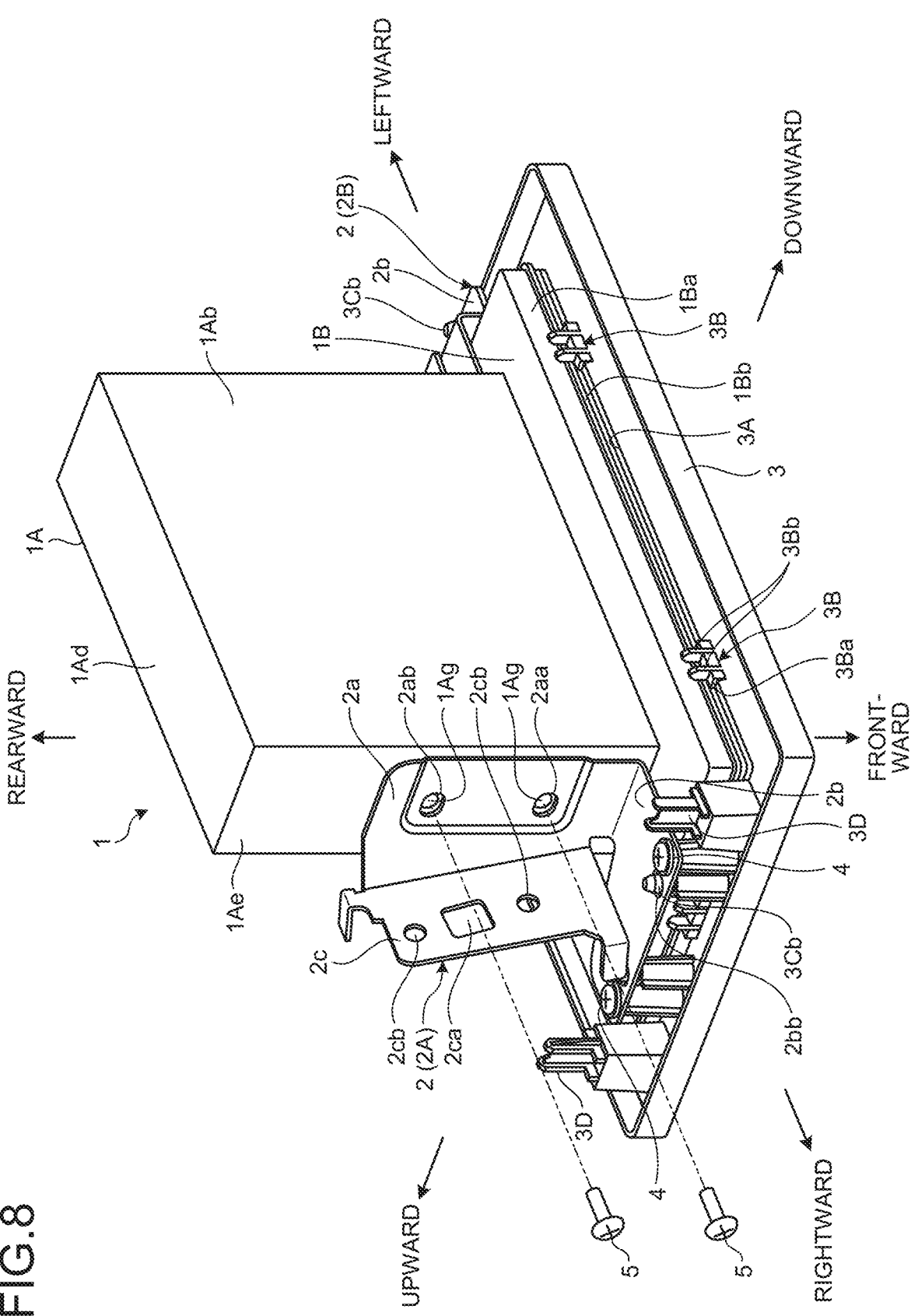
FIG. 8 is a perspective view of an assembly procedure of the in-vehicle system according to the embodiment.

Next, as illustrated in FIG. 5 and FIG. 8, at step S3, the vehicle mounting bracket 2 is temporarily fixed to the device main unit 1A of the in-vehicle device 1. At step S3, the device-side contact piece 2a of the vehicle mounting bracket 2 is positioned along the side surface (the right surface 1Ae and the left surface aAf) of the device main unit 1A, and screws 5 are fastened in the screw holes 1Ag through the mounting holes 2aa and 2ab. Thus, the vehicle mounting bracket 2 is temporarily fixed to the device main unit 1A.

Figure 9:
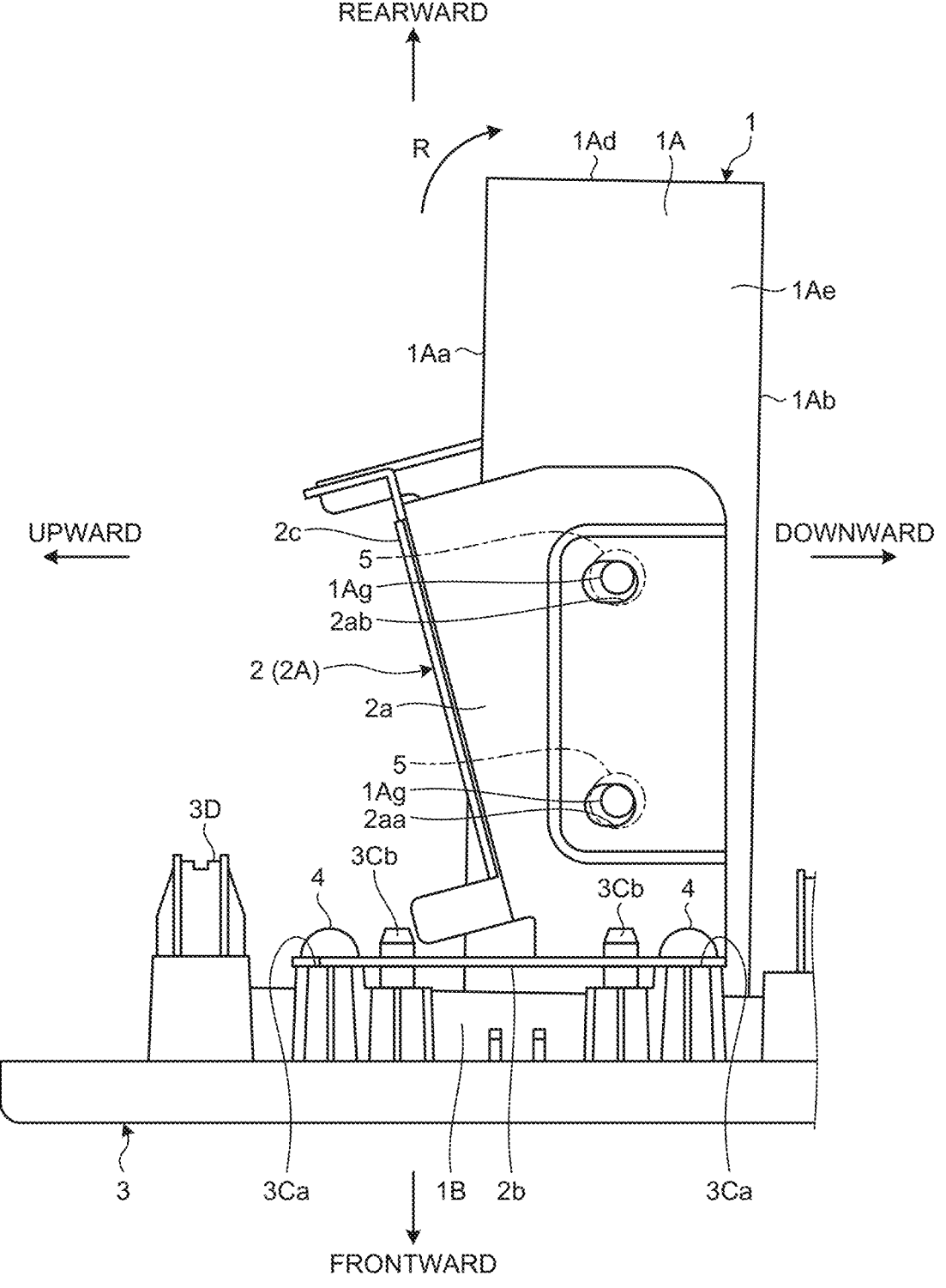
FIG. 9 is a side view of an assembly procedure of the in-vehicle system according to the embodiment.

At step S1 and step S2, the panel 1B of the in-vehicle device 1 and the vehicle mounting bracket 2 are positioned relative to the cluster panel 3, but there has been a problem that due to manufacturing errors in various areas, the mounting holes 2aa, 2ab of the device-side contact piece 2a of the vehicle mounting bracket 2 do not align with the screw holes 1Ag of the device main unit 1A, and the vehicle mounting bracket 2 cannot be mounted on the device main unit 1A with the screw 5. To deal with this problem, in the in-vehicle system, as illustrated in FIG. 9, the mounting holes 2aa, 2ab are formed to have a larger diameter than the screw hole 1Ag and, therefore, the manufacturing errors are absorbed and the mounting holes 2aa, 2ab and the screw holes 1Ag can be aligned. However, if the mounting holes 2aa, 2ab are formed to have a larger diameter than the screw hole 1Ag, the contact areas between the bearing surface of the screws 5 and peripheral portions of the mounting holes 2aa, 2ab become smaller, and this leads to insufficient friction and a necessary fastening force cannot be obtained, and there is a risk of loosing the screws 5. Therefore, in the in-vehicle system of the embodiment, in the mounting holes 2ab and 2bb, the vertical diameter of the mounting hole positioned in the front side is formed to be small, and formed to be larger as the mounting hole is positioned towards the rear side. In the in-vehicle system of the embodiment, since the panel 1B on the front side is positioned relative to the cluster panel 3, and the device-side contact piece 2*a* of the vehicle mounting brackets 2 (2A, 2B) are positioned along both of the side surfaces of the in-vehicle device 1 (the right surface 1Ae and the left surface 1Af), a tolerance due to manufacturing error is likely to mainly occur such that the device main unit 1A is tilted in the vertical direction largely in the rear side, as indicated by an arrow R in FIG. 9. Therefore, as the in-vehicle system of the embodiment, by forming the vertical hole diameter of the mounting holes 2*aa* and 2*ab* such that the vertical diameter of the mounting hole is formed to be larger as the mounting hole is positioned towards the rear side, it is possible to obtain a relatively large contact area for at least the mounting hole 2*aa* on the front side between its peripheral portion and the bearing surface of the screw 5. As a result, in the in-vehicle system of the embodiment, an issue of insufficient friction is less likely to be caused, and a necessary fastening force can be obtained, and thus a situation in which the screw 5 looses can be prevented. Moreover, in the in-vehicle system of the embodiment, the front-rear hole diameter of the mounting holes 2*aa*, 2*ab* is formed to have the same diameter, and the vertical diameter of the mounting hole is formed to be larger as the mounting hole is positioned towards the rear side. the vertical diameter of the mounting hole 2*ab* is formed to be larger than that of the mounting hole 2*aa*. Therefore, in the mounting holes 2*aa*, 2*ab*, it is possible to obtain a relatively large area on the contact surface between its peripheral portion and the bearing surface of the screw 5 by forming the same front-rear hole diameter. As a result, in the in-vehicle device of the embodiment, an issue of insufficient friction is less likely to occur, and a necessary fastening force can be obtained, and thus a situation in which the screw 5 looses can be prevented.

Figure 10:
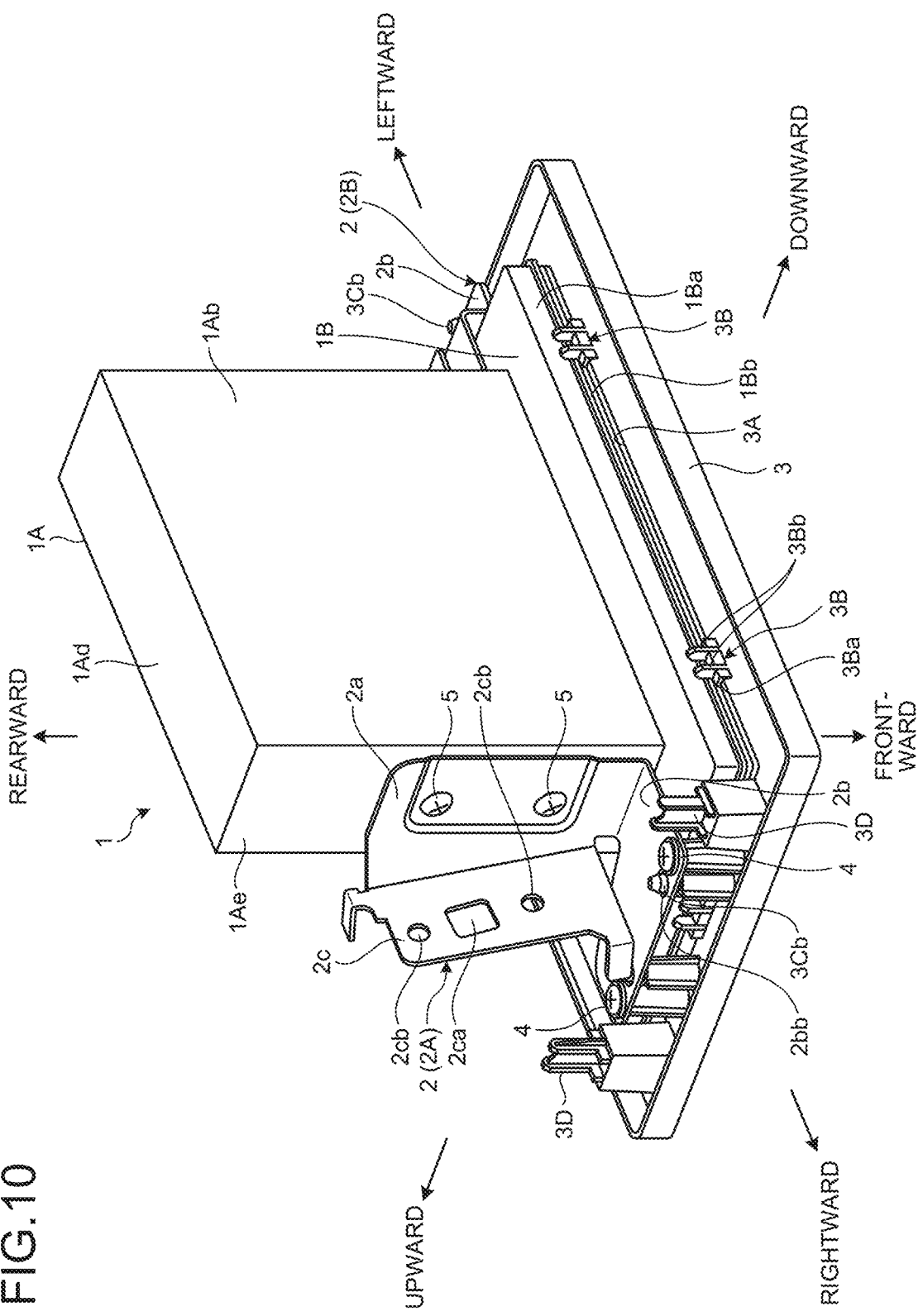
FIG. 10 is a perspective view of an assembly procedure of the in-vehicle system according to the embodiment.

Next, as illustrated in FIG. 5 and FIG. 10, at step S4, the vehicle mounting bracket 2 is fixed to the cluster panel 3. That is, at step S4, the vehicle mounting bracket 2 is fixed to the cluster panel 3 by fastening the screw 4. Subsequently, at step S5, the vehicle mounting bracket 2 is fixed to the device main unit 1A. That is, at step S5, the vehicle mounting bracket 2 is fixed to the device main unit 1A by fastening the screw 5.

The in-vehicle system of the embodiment is assembled as described, and by screwing the vehicle-side contact piece 2*c* of the vehicle mounting bracket 2 to the mounting surface of the vehicle, the in-vehicle system is installed in the vehicle.

When the in-vehicle system is installed in the vehicle, since the insertion hole 2*ca* of the vehicle-side contact piece 2*c* can be inserted in the protruding portion of the mounting surface of the vehicle with some margin, for example, a misalignment between the vehicle-side contact piece 2*c* and the vehicle occurred when the engaging protrusion 3D of the cluster panel 3 is engaged with the vehicle can be absorbed.

As described, the in-vehicle system includes: the in-vehicle device 1 that includes the device main unit 1A with the panel 1B provided on the front surface thereof; the cluster panel 3 that is arranged on the panel 1B; the positioning mechanism (the rib 1Bb, the claw portions 3B) which mutually positions the panel 1B and the cluster panel 3; the vehicle mounting bracket 2 that is fixed to the cluster panel 3 and the device main unit 1A, and that is mounted on the vehicle; and the multiple mounting holes 2*aa*, 2*ab* that are aligned in the vehicle longitudinal direction in the vehicle mounting bracket 2 and which correspond to the screw holes 1Ag which are provided on the side surface of the device main unit 1A, each of which has the larger diameter than each of the screw holes 1Ag, and the vertical diameter of the mounting hole is formed to be larger as the mounting hole is positioned towards the vehicle front side.

In this in-vehicle system, since the mounting holes 2*aa*, 2*ab* are formed to have a larger diameter than the respective screw holes 1Ag, manufacturing errors can be absorbed to align the mounting holes 2*aa*, 2*ab* with the screw holes 1Ag. Particularly, in this in-vehicle system, since the vertical diameter of the mounting hole is formed to be larger as the mounting hole is positioned towards the rear side, for a phenomenon that the tolerance becomes larger on the rear side due to the tilt of the device main unit 1A in the vertical direction, it is possible to obtain, at least for the mounting hole 2*aa* on the front side, a relatively large contact area between its peripheral portion and the bearing surface of the screw 5. As a result, according to the in-vehicle system of the embodiment, the in-vehicle device 1 and the vehicle mounting bracket 2 can be fixed with a necessary fastening force, while maintaining the positional relationship between the in-vehicle device 1 and the cluster panel 3 with the positioning mechanism (the rib 1Bb, the claw portion 3B).

Moreover, in the in-vehicle system of the embodiment, in the mounting holes 2*aa* and 2*ab*, the front-rear hole diameter thereof is formed to be the same, and the vertical diameter of the mounting hole is formed to be larger as the mounting hole is positioned towards the rear side.

According to this in-vehicle system, since the front-rear diameter is configured to be the same in the mounting holes 2*aa*, 2*ab*, a contact area between its peripheral portion and the bearing surface of the screw 5 can be made relatively large. As a result, the in-vehicle system of the embodiment can obtain a necessary fastening force.

Furthermore, in the in-vehicle system of the embodiment, the positioning mechanism includes the claw portions 3B formed at the top, bottom, left, and right inside the frame of the cluster panel 3, and the rib 1Bb that is formed on the outer circumference of the panel 1B so as to restrict movement of the panel 1B in the forward, upward, downward, leftward, and rightward directions relative to the cluster panel 3, and that is engaged with the claw portions 3B.

According to this in-vehicle system, by restricting the in-vehicle device 1 and the cluster panel 3 in the forward, upward, downward, leftward, and rightward directions, such a positional relationship between the in-vehicle device 1 and the cluster panel 3 that the device main unit 1A tilts in the vertical direction in order to obtain the above effects by the mounting holes 2*aa*, 2*ab* is achieved.

Furthermore, in the in-vehicle system of the embodiment, the vehicle mounting bracket 2 includes the panel-side contact piece 2*b* that abuts on the abutting portion 3Ca formed on the rear side of the cluster panel 3 to be fixed, and the insertion holes 2*bb* which are arranged in the panel-side contact piece 2*b* and in which the protruding portions 3Cb formed on the rear side of the cluster panel 3 are inserted.

According to this in-vehicle system, the vehicle mounting bracket 2 can be positioned on the rear surface of the cluster panel 3 to be fixed, and a positional relationship between the vehicle mounting bracket 2 and the cluster panel 3 in order to obtain the above effects by the mounting holes 2*aa*, 2*ab* can be achieved.

The assembling method of the in-vehicle system of the embodiment includes a step of positioning the cluster panel 3 and the panel 1B by the positioning mechanism (the rib 1Bb, the claw portion 3B), a step of fixing the vehicle mounting bracket 2 to the cluster panel 3, and a step of fixing the vehicle mounting bracket 2 to the device main unit 1A by fastening the screws 5 in the screw holes 1Ag through the mounting holes 2*aa*, 2*ab*.

According to this assembling method of the in-vehicle system, the in-vehicle device 1 and the vehicle mounting bracket 2 can be fixed with a necessary fastening force while maintaining the positional relationship between the in-vehicle device 1 and the cluster panel 3 by the positioning mechanism (the rib 1Bb, the claw portion 3B).

According to this application, an in-vehicle device and a vehicle mounting bracket can be fixed with a necessary fastening force while maintaining a positional relationship between the in-vehicle device and a cluster panel.

According to the present application, it is possible to fix an in-vehicle device and a vehicle mounting bracket with a necessary fastening force while maintaining a positioning relationship between the in-vehicle device and a cluster panel.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An in-vehicle system comprising:
an in-vehicle device that includes a device main unit with a panel provided on a front surface thereof;
a cluster panel that is arranged on the panel;
a positioning mechanism which mutually positions the panel and the cluster panel;
a vehicle mounting bracket that is fixed to the cluster panel and the device main unit, and that is mounted on a vehicle; and
multiple mounting holes that are aligned in a vehicle longitudinal direction in the vehicle mounting bracket and which correspond to screw holes which are provided on a side surface of the device main unit, each of which has a larger diameter than each of screw holes, and a vertical diameter of the mounting hole is formed to be larger as the mounting hole is positioned towards a vehicle front side.

2. The in-vehicle system according to claim 1, wherein each of the mounting holes is formed to have a same front-rear hole diameter.

3. The in-vehicle system according to claim 1, wherein the positioning mechanism includes claw portions that are formed at a top, bottom, left, and right inside a frame of the cluster panel; and a rib that is formed on an outer periphery of the panel so as to restrict the panel in forward, upward, downward, leftward, and rightward directions relative to the cluster panel by being engaged with the claw portions.

4. The in-vehicle system according to claim 1, wherein the vehicle mounting bracket includes a panel-side contact piece that abuts on an abutting portion formed on a rear surface of the cluster panel to be fixed; and insertion holes which are arranged on the panel-side contact piece and in which protruding portions formed on the rear surface of the cluster panel are inserted.

5. An assembling method of an in-vehicle system that includes:
an in-vehicle device that includes a device main unit with a panel provided on a front surface thereof;
a cluster panel that is arranged on the panel;
a positioning mechanism which mutually positions the panel and the cluster panel;
a vehicle mounting bracket that is fixed to the cluster panel and the device main unit, and that is mounted on a vehicle; and
multiple mounting holes that are aligned in a vehicle longitudinal direction in the vehicle mounting bracket and which correspond to screw holes which are provided on a side surface of the device main unit, each of which has a larger diameter than each of screw holes, and a vertical diameter of the mounting hole is formed to be larger as the mounting hole is positioned towards a vehicle front side, the method comprising:
positioning the cluster panel and the panel by the positioning mechanism;
fixing the vehicle mounting bracket to the cluster panel; and
fixing the vehicle mounting bracket to the device main unit by fastening screws in the screw holes through the mounting holes.

* * * * *